(12) United States Patent
Lowry et al.

(10) Patent No.: US 6,396,985 B2
(45) Date of Patent: May 28, 2002

(54) CONTOURED LARGE SCREEN DISPLAY APPARATUS

(75) Inventors: Brian C. Lowry, Emlenton; Jerald F. Lowry, Pittsburgh, both of PA (US)

(73) Assignee: Transvision, Inc., Pittsburgh, PA (US)

( * ) Notice: Subject to any disclaimer, the term of this patent is extended or adjusted under 35 U.S.C. 154(b) by 0 days.

(21) Appl. No.: 09/766,466

(22) Filed: Jan. 19, 2001

Related U.S. Application Data

(63) Continuation-in-part of application No. 09/482,290, filed on Jan. 13, 2000, now Pat. No. 6,304,703.

(51) Int. Cl.[7] .......................... G02B 6/04; G09F 13/18; G09G 3/00
(52) U.S. Cl. .................. 385/120; 385/115; 385/116; 385/121; 385/147; 385/901; 385/1; 385/42; 40/546; 40/547; 345/32; 345/40; 345/55; 359/451; 359/10; 359/11
(58) Field of Search .................. 385/115, 116, 385/120, 121, 147, 901, 1, 2, 42; 40/546, 547; 345/32, 40, 55; 359/451, 10, 11

(56) References Cited

U.S. PATENT DOCUMENTS

| | | | | |
|---|---|---|---|---|
| 3,295,910 A | * | 1/1967 | Hourdiaux | 359/451 X |
| 3,644,922 A | * | 2/1972 | James et al. | 385/121 X |
| 3,815,986 A | * | 6/1974 | Darbee | 385/901 X |
| 3,853,658 A | | 12/1974 | Ney | 385/115 X |
| 4,116,739 A | * | 9/1978 | Glenn | 156/169 |
| 4,417,412 A | | 11/1983 | Sansom | 40/547 |
| 4,650,280 A | * | 3/1987 | Sedlmayr | 385/120 X |
| 4,738,510 A | | 4/1988 | Sansom | 385/115 X |
| 4,929,048 A | | 5/1990 | Cuypers | 385/115 X |
| 5,129,028 A | | 7/1992 | Soltan | 385/120 |
| 5,293,437 A | | 3/1994 | Nixon | 385/115 |
| 5,376,980 A | * | 12/1994 | Gersuk et al. | 353/94 |
| 5,381,502 A | * | 1/1995 | Veligdan | 385/115 |
| 5,400,178 A | * | 3/1995 | Yamada et al. | 359/449 |
| 5,642,449 A | | 6/1997 | Phillips | 385/33 |
| 5,832,168 A | * | 11/1998 | Yenter | 385/147 |
| 5,911,024 A | | 6/1999 | Wallace | 385/115 |
| 6,219,184 B1 | * | 4/2001 | Nagatani | 359/472 |
| 6,304,703 B1 | * | 10/2001 | Lowry | 385/120 |

* cited by examiner

*Primary Examiner*—Brian Healy
(74) *Attorney, Agent, or Firm*—James M. Singer; Pepper Hamilton LLP

(57) ABSTRACT

An apparatus for use in contoured architectural milieus includes a contoured large screen display having a mounting means to which modular flat display tiles including, tiles of diverse or non-standard shapes and sizes are attached, each display tile having a plurality of optical fibers affixed behind the tile and communicating with a front surface of the tile.

8 Claims, 6 Drawing Sheets

CONTOURED LARGE SCREEN DISPLAY APPARATUS

CLAIM OF PRIORITY AND RELATED APPLICATIONS

This application claims priority to, is a continuation-in-part of, and incorporates by reference in its entirety U.S. patent application Ser. No. 09/482,290 filed Jan. 13, 2000, now U.S. Pat. No. 6,304,703, entitled "Tiled Fiber Optic Display Apparatus".

This application relates to the United States Provisional Applications of Brian C. Lowry, entitled "Optical Display Apparatus" and "Architectural Display and Lighting System with Interactive Capability," each filed on the even date herewith, which are incorporated herein by reference in their entirety.

This application also relates to and incorporates by reference in its entirety U.S. patent application Ser. No. 09/718,744, entitled "Micro-Display Driven Tiled Electro-Optic Display Apparatus," filed May 12, 2000.

BACKGROUND OF THE INVENTION

Large screen displays may be defined as any dynamic display that can be viewed by more than one person and is at least two feet wide. The large screen display market is diverse, with many differing products and technologies, each having certain strengths and weaknesses, competing to fill the needs of the end user. Applications requiring outdoor use in direct sunlight have traditionally been served best by cathode ray tube (CRT) or light emitting diode (LED) displays, while indoor applications may be served by video walls or front/rear projection systems. Fiber optic large screen displays, however, offer substantial improvements over current CRT- and LED-based displays, due to their smaller depth, lighter weight, and elimination of sensitive and expensive electronic components from the surface of the display, while delivering superior resolution and adequate brightness for direct sunlight applications. Fiber optic large screen displays are also superior to "video walls" (arrays of discrete television monitors) because of the lack of mullions, improved brightness, more rugged design, and thinner construction. Finally, fiber optic displays have an advantage over projection systems in that the display unit can be easily moved and easily installed. Whatever the enabling technology, large screen displays represent a currently robust market that is projected to grow substantially in the future.

Traditional large screen displays are flat screen displays. However, market demands, as well as certain architectural constraints, may also affect the choice of large screen display technology for a particular venue. For instance, not all milieus are best served by flat screens. A large screen display technology that is adaptable to contoured architectural milieus of various configurations will, in turn, increase the number and scope of possible applications for an already widely used and valued technology.

As evidenced by the constantly changing aesthetics of architectural design (e.g., the impact of Frank Gehry's design for the Guggenheim Museum in Bilbao, Spain), large screen display technology needs to be equally adaptive to non-traditional display milieus. The ability to fabricate and deploy both planar and contoured large screen displays will result in almost limitless applications in public venues, with greatly expanded market share. There is a need for a way to make large screen displays that are contoured rather than planar, or are comprised of both planar and contoured areas.

Previous attempts at constructing contoured large screen displays with uniform, distortion-free images have recognizable shortcomings. In the example of modular "video walls," a contoured display ensemble will include significant and distracting gaps between the monitors or "picture blocks," as well as significant image distortion if the image is presented on two or more units of the video wall grid. One example is the NASDAQ exterior display in New York City's Times Square at the time of the filing of this application, where a viewer standing very close or at an unusual viewing angle observes considerable distortion, even though this sign is used primarily to present alpha-numeric data rather than graphics or video. The distortion is even more present if the contours of the display follows multiple planes. Therefore, there is a need for a way to make a contoured display that presents a uniform, distortion-free picture.

In accordance with a preferred embodiment of the present invention, the invention features an apparatus for use in contoured architectural milieus, or other locations where a contoured large screen display is desired, including a contoured large screen display having a mounting means to which modular display tiles are attached, at least one of the modular flat display tiles has diverse or non-standard shapes and sizes, and each display tile having a plurality of optical fibers affixed behind the tile and in communication with a front surface of the tile to form a matrix comprising a plurality of points having a pitch between each point.

Another embodiment of the present invention features a contoured large screen display apparatus for display of a substantially uniform, substantially distortion-free image including: modular display tiles attached to a contoured mounting means, the ordered placement of which tiles is determined by the shape and size of the contoured large screen display; fiber optic strands fixedly attached to the display tiles and communicating with the front surfaces of the display tiles, with pitch variations between the individual fibers, the various pitches being determined by the positions of the display tiles on the contoured large screen display and, in particular by the positive or negative radius of curvature of the surface contour of the display at the placement location of each display tile.

Another embodiment of the present invention features the use of software, optical lenses, and/or refractive micro-lens arrays in the creation and projection of display images with the intention of eliminating image distortion on the contoured large screen display.

DETAILED DESCRIPTION OF PREFERRED EMBODIMENTS OF THE INVENTION

In a preferred embodiment, this invention is an apparatus that uses fiber optic technology together with modular flat tiles of various shapes and sizes to enable the fabrication of a contoured large screen display. Additionally, the embodiments of this apparatus include three means of presenting a uniform, distortion-free image, even on contoured surfaces.

Figure 1:
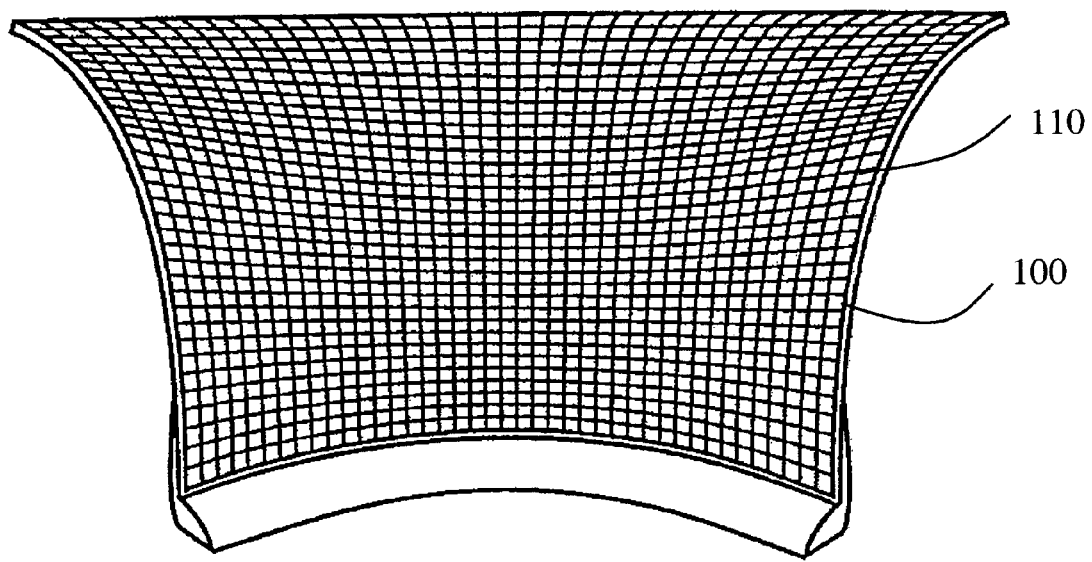
FIG. 1 is a contoured large screen display.

FIG. 1 is an overview illustration of a contoured large screen display 100 comprised of a plurality of modular flat tiles 110 of various shapes and sizes such as 6-inch square modular tiles and modular tiles of other shapes (e.g., triangular, trapezoidal, hexagonal, etc.) and sizes. The modular tiles are optionally and preferably flat, although curved tiles may be used. The shapes and sizes illustrated in FIG. 1 are only intended as exemplary, and any shape or size is acceptable, depending on the application. The tiles are made of any light-absorbing material, preferably a non-reflective or substantially non-reflective material or covering, preferably a material having a black pigment or portion, such as a thermoplastic, composite material, or even a canvas. Also preferably, the tile is comprised of a non-conductive or substantially nonconductive material.

In operation, contoured large screen display 100 presents seamless display graphics to the viewer. Although FIG. 1 represents the display surface as characterized by a grid-like tiling, this representation serves only to illustrate the modular nature of the display and the fact that the display is comprised of flat tiles of various shapes and sizes. The grid-like tiling will not be perceived by the viewer at a distance from the display when contoured large screen display 100 is in operation.

Figure 2:
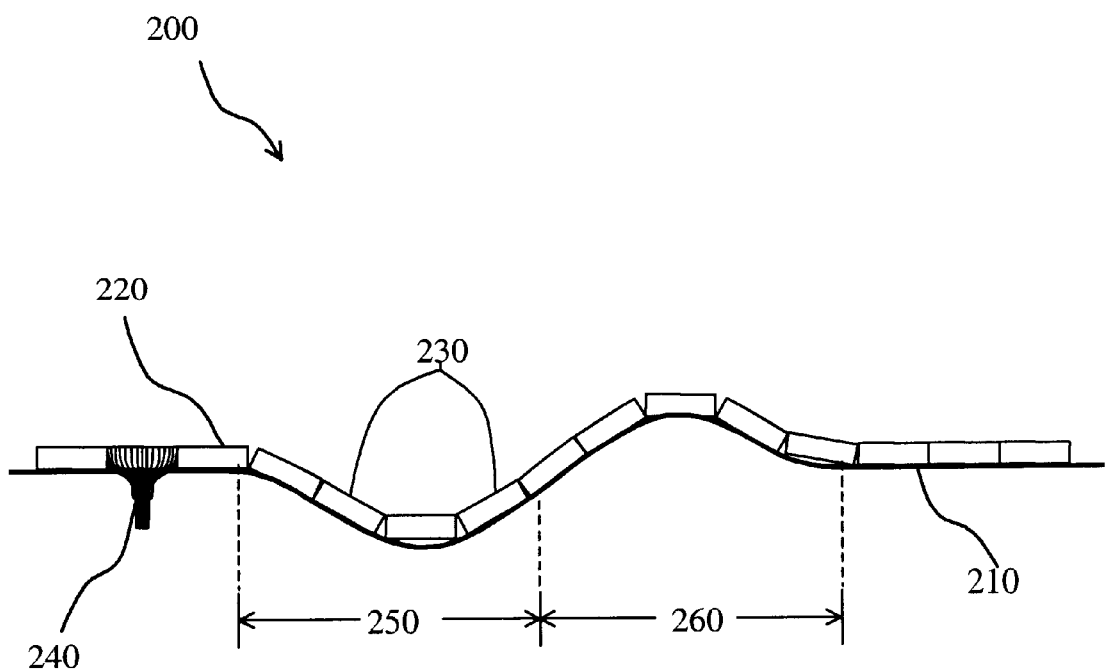
FIG. 2 is a contoured large screen display surface with modular flat tiles of various shapes and sizes.

FIG. 2 is a diagram illustrating a contoured large screen display 200 surface with modular flat tiles of various shapes and sizes 230 including a mounting surface 210, modular flat tiles of standard size 220, modular flat tiles of diverse shapes and sizes 230, and fiber optic bundles 240.

A plurality of modular flat tiles of standard shape and size 220 are demountably attached to the mounting surface 210; in one example a standard clip mounting technique is used. Alternate mounting techniques, such as a tab and receiving means, or a post and receptacle, may also be used. Modular flat tiles 220 are attached to the extent that the entirety, or substantially the entirety, of the planar areas of the display surface is covered. Likewise, a plurality of modular flat tiles of diverse (non-standard) shapes and sizes 230 are demountably attached in a similar manner to mounting surface 210 to the extent that the entirety of the contoured areas of the display surface are covered. Ordered fiber optic bundles 240 are optically connected to each and every tile of standard shape and size 220 and to each and every tile of non-standard shape and size 230.

In operation, mounting surface 210 optionally has modular flat tiles of standard shape and size 220, and it also includes modular flat tiles of diverse, non-standard shape and/or size and/or pitch 230 attached so that the entirety of the display surface is covered. As will be further described in the upcoming figures, inserted into each tile are multitudes of fiber optic strands 310 as shown in FIGS. 3A & B, gathered into ordered fiber optic bundles 240. As used herein, a "non-standard" tile includes a tile having a shape other than a square or rectangle, and/or a size differing from the other tiles, or varying (i.e., non-uniform) pitch (as described below).

Figure 3:
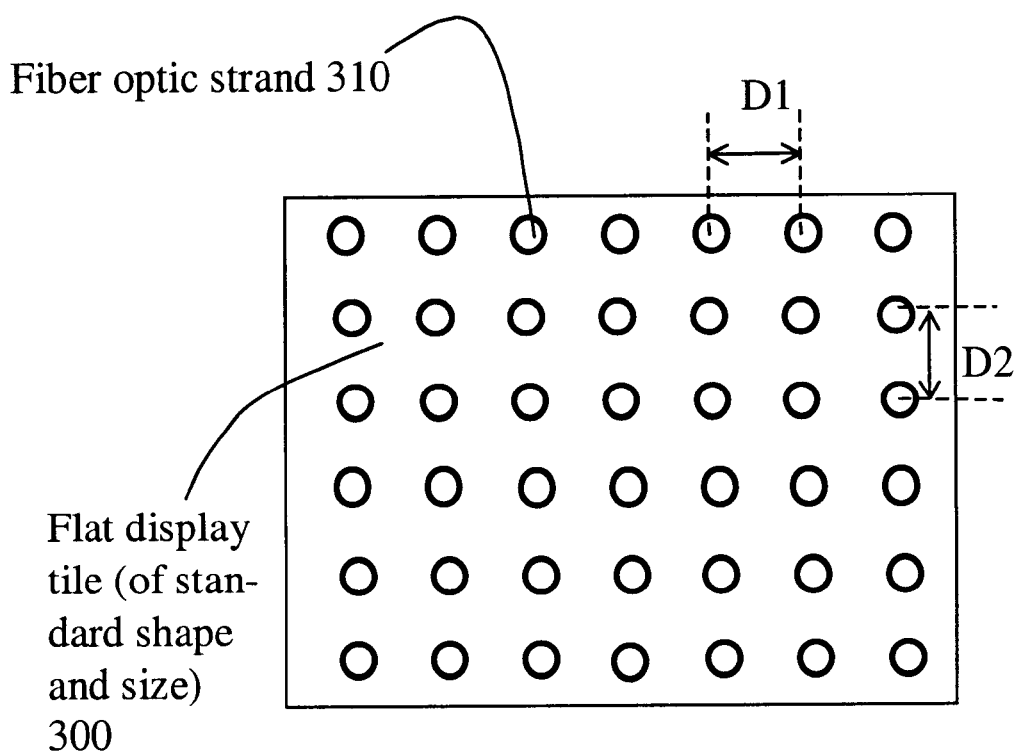
FIG. 3 is a front view of a display tile of standard shape and size with uniform pitch between fiber optic strands.

Referring to FIG. 3, the pitch (or linear spacing) between fiber optic strands 310 within each tile varies according to the type of tile (standard shape and size or non-standard shape and size) covering mounting means 210 (of FIG. 2) and the shape of mounting means 210. From the perspective of a viewer, a, concave surface 250 would preferably feature tiles with greater pitch (greater spacing, thus more loosely packed), while a convex surface 260 would preferably feature tiles with lesser pitch (smaller spacing, thus more tightly packed). Variation of the pitch between fiber optic strands is more completely covered in FIGS. 5 and 6.

Figures 3B, 4:
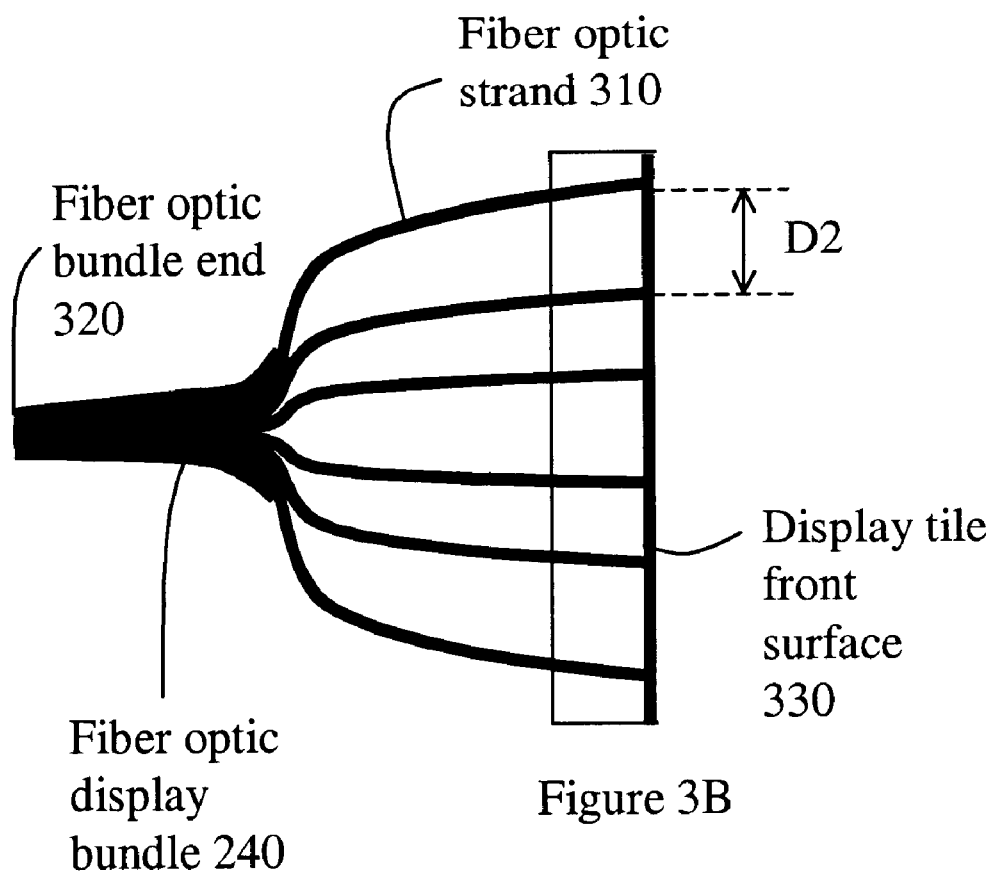
FIG. 4 is a side view of a display tile of standard shape and size with uniform pitch between fiber optic strands.

FIGS. 3 and 4 are diagrams illustrating an exemplary display tile of standard shape and size 300 with uniform pitch between fiber optic strands 310 from two perspectives, including a display tile of standard shape and size 300, fiber optic strands 310 included in a fiber optic display bundle 240 (FIG. 2) having an ordered fiber optic bundle end 320, and a tile front surface 330.

Fiber optic strands 310 are inserted into modular display tile of standard shape and size 300, through a two-dimensional array of holes formed in modular display tile 300 at the time of manufacture of the tile. The fibers may be affixed in place with optical epoxy (e.g., EpoTek 301) or held in fiber carriers. A method for manufacturing and using modular optical fiber display tiles 300 is fully shown and described in pending United States Utility Patent Applications No. 09/569,811 entitled "Micro-Display Driven Tiled Electro-Optic Display Apparatus" and No. 09/718,745 entitled "A Large Screen Fiber Optic Display With High Fiber Density and Method for its Rapid Assembly," both of which are commonly owned and assigned, and are herein incorporated by reference in their entirety.

As visible from the side view (FIG. 4), fiber optic strands 310 are fixedly gathered in fiber optic display bundle 240 to the rear of modular display tile of standard shape and size 300.

In operation, any portion of large screen display 100 that is planar is preferably comprised of a plurality of modular flat display tiles of standard shape and size 300. Display tiles of standard shape and size 300 each feature a plurality of fiber optic strands 310, which transport the image to be displayed from fiber optic bundle end 320, in the form of light, to display tile 300 front surface 330. Embedded in display tiles of standard shape and size 300, fiber optic strands 310 proceed from said display tiles and are fixedly gathered in ordered fiber optic bundles 240, one bundle for each display tile 300. At the display tile 300 front surface 330, fiber optic strands 310 are separated from one another at distances D1 (horizontally) and D2 (vertically) that are uniform for each separation within standard modular display tile 300. This uniform separation (in two orthogonal directions)—or pitch—enables the viewer to see a uniform image displayed across the entirety of standard modular flat display tiles 300 covering planar large screen display 100, if entirely planar.

Figure 5:
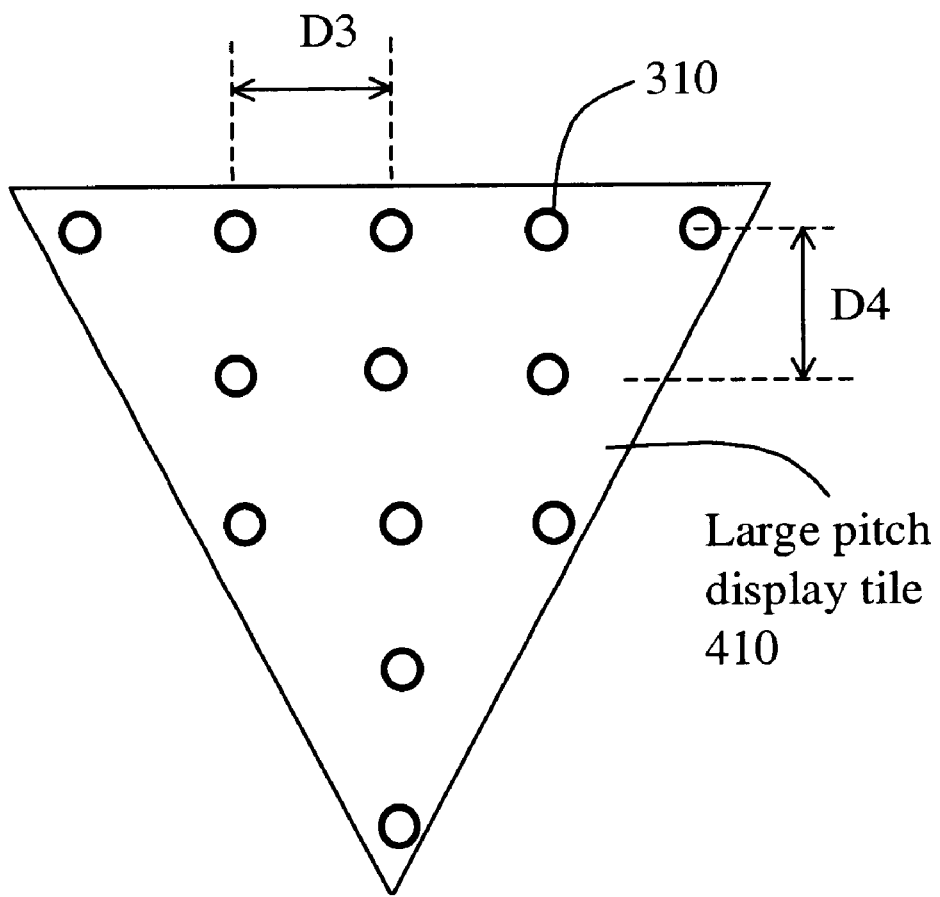
FIG. 5 is a front view of a flat large pitch display tile of diverse shape and size.
Figure 6:
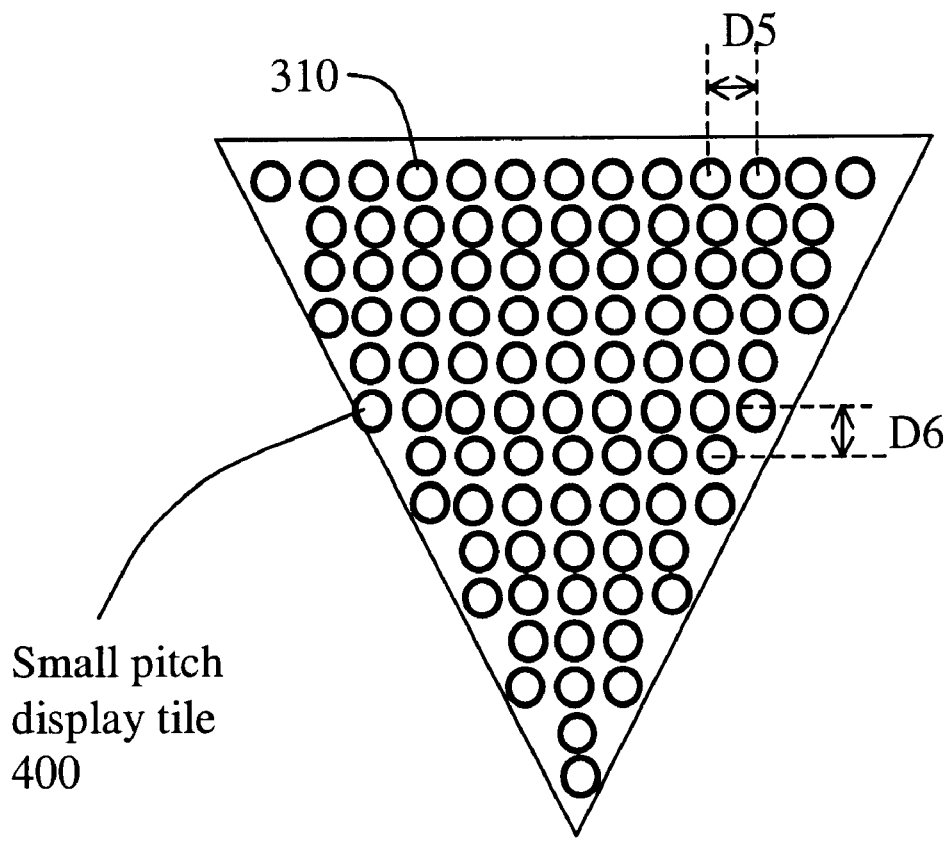
FIG. 6 is a front view of a small pitch display tile of diverse shape and size.

FIGS. 5 and 6 are diagrams illustrating display tiles of diverse shapes and sizes having pitch variations, including a large pitch display tile 410 shown in FIG. 5, small pitch display tile 400 shown in FIG. 6, and multitudes of fiber optic strands 310. The sizes and shapes of the tiles in FIGS. 5 and 6 are exemplary, and other shapes and sizes may be used. Fiber optic strands 310 are inserted into both large pitch display tile 410 and small pitch display tile 400, terminating at or near the display surface in all cases.

In operation, any portion of large screen display 100 that is contoured is comprised of a multitude of modular flat display tiles of standard shape and size and uniform, standard pitch 300, large pitch flat display tiles of diverse shapes and sizes 410, and small pitch flat display tiles of diverse shapes and sizes 400, creating the entirety of the large screen display 100. The placement of the modular flat display tiles of standard 300 or diverse shapes and sizes 230, and of standard pitch as shown in FIG. 3, large pitch 410, or small pitch 400, is dependent upon the shape of contoured large screen display 100. This placement is shown and described in FIG. 2. A plurality of fiber optic strands 310 transports the image to be displayed from fiber optic bundle end 320, in the form of light, to large pitch display tiles 410 and small pitch display tiles 400. Fiber optic strands 310 proceed from each tile and are fixedly gathered in ordered fiber optic bundles 240, one bundle for each tile. The key difference between large pitch display tile 410 and small pitch display tile 400 is the separation (or pitch) between fiber optic strands 310. Variation of the pitch between optical fibers affects both the resolution and the distortion of contoured large screen display 100 as seen by viewers. Large pitch display tiles 410 with orthogonal pitches of value D3 and D4 are used on concave surface 250 of contoured large display screen 100. Similarly, small pitch display tiles 400 with orthogonal pitches of values D5 and D6 are used on convex surface 260 of contoured large display screen 100.

Contoured large screen display 100 may be equipped to minimize optical distortion of the displayed image caused by the various surface contours. However, there are certain applications in which image distortion may be desired and, in fact, the surface contours of contoured large screen display 100 may be specifically designed to create images that are optically distorted in a predetermined manner. Possible techniques for reduction or elimination of image distortion include: (1) pitch variation (as described above); (2) the use of image-correction software that will electronically alter the two-dimensional image by compressing and/or expanding the image across ordered fiber optic bundle ends 320; (3) the use of custom-figured (anamorphic) optical lenses for contour-specific modification of the image to compress and/or expand the image across each fiber optic bundle end 320; and (4) the use of refractive micro-lens arrays for manipulating and correcting the displayed image onto each individual fiber optic strand 310 in each fiber optic bundle end 320.

One advantage of this invention is a means of creating a contoured large screen display for milieus having various architectural configurations. A second advantage of this invention is a contoured large screen display with uniform, distortion-free images. A third advantage of this invention is a contoured or planar large screen display featuring lower fabrication costs and simple maintenance afforded by the inherent modular flat tiling design of the display.

It is to be understood that the invention is not limited in its application to the details of construction and to the arrangements of the components set forth herein the following or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A contoured large screen display, comprising:
   (a) a mounting surface having at least one contoured portion;
   (b) a plurality of modular display tiles connected to the mounting surface, wherein the tiles comprise both standard and non-standard tiles;
   wherein each tile has a substantially planar front surface, a plurality of optical fibers having first ends and second ends are connected to each tile such that the second end of each optical fiber is communicative with the front surface of its corresponding tile, the fibers are positioned to form a matrix at the front surface, and the matrix comprises a plurality of points having a fiber pitch between each point; and
   wherein each of the optical fibers is operative to transfer an image portion from the first end to the front surface via the second end.

2. The display of claim 1, wherein the display tiles substantially follow the contoured portion of the mounting surface along a plurality of planes to form a contoured display surface, and wherein at least two of the planes intersect.

3. The display of claim 1 wherein the display tiles substantially follow the contoured portion of the mounting surface along a plurality of planes to form a contoured display surface, and wherein at least two of the planes are parallel and separated by a spacing greater than zero.

4. The display of claim 1 wherein the standard tiles are square or rectangular in shape.

5. The display of claim 1 wherein each non-standard display tile has a shape other than a square or rectangle.

6. The display of claim 2 wherein the fiber pitch within each non-standard display tile is greater for tiles that correspond to a concave curvature of the display surface and smaller for tiles that correspond to a convex curvature of the display surface.

7. The display of claim 1 wherein each of the modular display tiles is comprised of a substantially non-reflective, substantially non-conductive material.

8. The display of claim 1 further including an image manipulation means for adjusting the image transferred through the optical fibers by at least one of image compression and expansion to compensate for distortion.

* * * * *